United States Patent

[11] 3,610,575

| [72] | Inventor | Rikizo Yoneda<br>64, Shimogamo Umenoki-cho, Sakyo-ku, Kyoto, Japan |
|---|---|---|
| [21] | Appl. No. | 850,891 |
| [22] | Filed | Aug. 18, 1969 |
| [45] | Patented | Oct. 5, 1971 |

[54] SEAT RING FOR BALL VALVES
5 Claims, 6 Drawing Figs.

| [52] | U.S. Cl. | 251/315 |
|---|---|---|
| [51] | Int. Cl. | F16k 5/06 |
| [50] | Field of Search | 251/315, 317, 363 |

[56] References Cited
UNITED STATES PATENTS

| 2,310,583 | 2/1943 | Johnson | 251/317 |
|---|---|---|---|
| 2,373,628 | 4/1945 | Gleeson | 251/315 |
| 2,943,838 | 7/1960 | Skei | 251/317 |
| 2,985,421 | 5/1961 | Anderson et al. | 251/363 X |
| 2,985,422 | 5/1961 | Anderson et al. | 251/363 X |
| 3,035,811 | 5/1962 | Hamer | 251/317 |
| 3,272,472 | 9/1966 | Goldman | 251/315 X |
| 3,356,337 | 12/1967 | Olen | 251/315 |
| 3,367,359 | 2/1968 | Johnson | 251/315 X |
| 3,397,861 | 8/1968 | Scaramucci | 251/315 X |

*Primary Examiner*—M. Cary Nelson
*Assistant Examiner*—Michael O. Sturm
*Attorney*—Fidelman, Wolffe & Leitner ABSTRACT: A seat ring for ball valves which comprises an annular body made of natural or synthetic rubber and adapted to be disposed in the valve chamber so as to be in sealing contact with the ball therein; an annular core made of a rigid material and enclosed circumferentially in said annular body; and a lamina of a plastic material covering at least that portion of the outer surface of said annular body which is in sealing contact with said ball. The core ring makes the whole structure of the seat ring strong, and the plastic lamina reduces the frictional resistance between the seat ring and the ball thereby enabling smooth operation of the valve and, in combination with the rubber body, provides a good sealing effect between the ring and the ball.

PATENTED OCT 5 1971 3,610,575

SEAT RING FOR BALL VALVES

This invention relates to a new and improved seat ring for use in ball valves.

It has hitherto been customary to use seat rings made of rubber in ball valves. However, since rubber has a high coefficiency of friction, such prior art seat rings present so great a frictional resistance to the ball of the valve that a strong force is required to turn the ball to open or close the valve. With such a high frictional resistance of the rubber seat ring, repeated turning of the ball causes the seat ring it contacts to be repeatedly deformed and subjected to strong internal stress and strain, with a resulting increase in the fatigue of the material of the seat ring.

Accordingly, the primary object of the invention is to provide a new and improved seat ring for use in ball valves which is completely free from the above defects of the conventional seat rings.

Another object of the invention is to provide a new and improved seat ring for use in ball valves wherein the ball in contact with the seat ring can be turned smoothly with a relatively small force, and yet a very high degree of sealing effect is retained between the seat ring and the ball.

Another object of the invention is to provide a new and improved seat ring for use in ball valves which has a high degree of durability and reliability in use.

The above and other objects of the invention are attained by the provision of a seat ring comprising an annular body made of rubber and adapted to be disposed in the valve chamber of a ball valve so as to be in sealing contact with the ball therein; an annular core made of a rigid material and at least partially enclosed circumferentially in said annular body; and a lamina of a plastic material covering at least that portion of said annular body which is in sealing contact with said ball.

The invention will be clearly understood from the following description of some preferred embodiments thereof with reference to the accompanying drawings, wherein.

Figure 1:
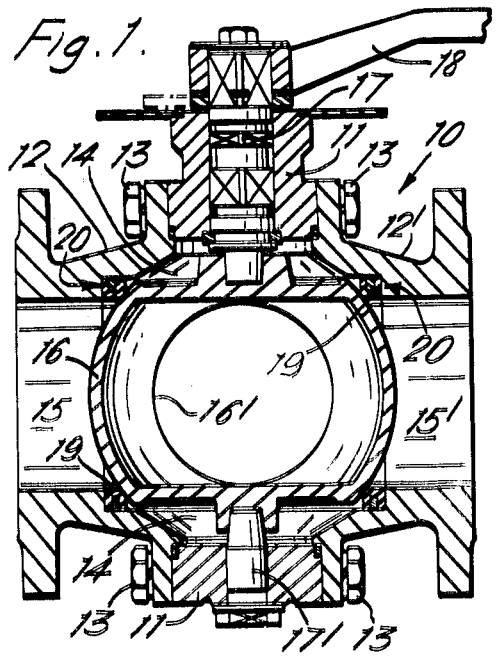
FIG. 1 is a an elevational view, in vertical section, of a ball valve provided with a seat ring embodying the invention.
Figure 4:
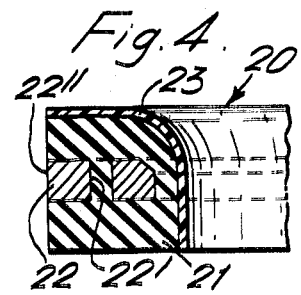
FIG. 4 is a fragmentary enlarged view of FIG. 3.
Figure 5:
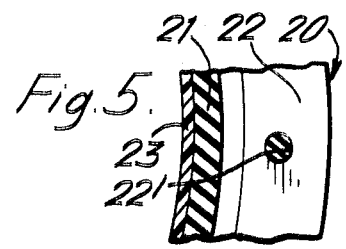
FIG. 5 is a fragmentary enlarged view of FIG. 2.
Figure 2:
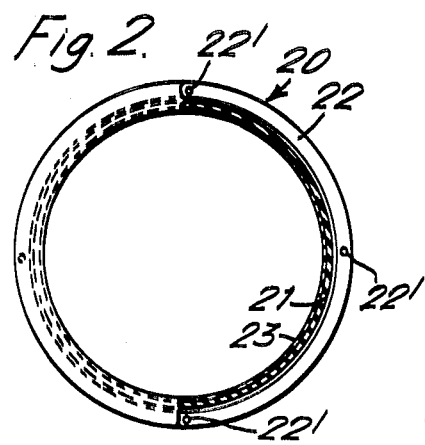
FIG. 2 is a top plan view, partly in transverse section, of the seat ring shown in FIG. 1.

Referring now in detail to FIG. 1, there is shown a ball valve generally designated by 10 which comprises a body 11 and a pair of side components 12 and 12' secured to the opposite sides of the body by means of bolts 13. The valve 10 has a valve chamber 14 formed therein and a pair of passages 15 and 15' communicating with the chamber 14 at the opposite sides thereof. A ball 16 having a through bore 16' is disposed in the valve chamber 14 and rotatably supported by a pair of upper and lower stems 17 and 17'. A handle 18 is secured to the upper stem 17 so as to be handled by an operator thereby to turn the ball 16 to selectively open and close the valve.

A circumferential shoulder 19 is formed at the opposite sides of the valve chamber 14 where the chamber transforms itself into the passages 15 and 15'. On each of the shoulders 19 there is provided a seat ring 20 in sealing contact with the outer surface of the ball 16 and the surface of the shoulder. The seat ring 20 comprises an annular body 21 made of rubber, which may be natural or synthetic, an annular core 22 made of a rigid material such as iron and enclosed or embedded in the body 21, and a lamina or film 23 of a plastic material covering that portion of the outer surface of the annular body 21 which is in contact with the outer surface of the ball 16.

The lamina 23 may be formed by affixing a plastic film to the surface of the annular rubber body 21 by a suitable adhesive, or it may be formed by coating the surface of the annular body 21 with the plastic material.

Figure 3:
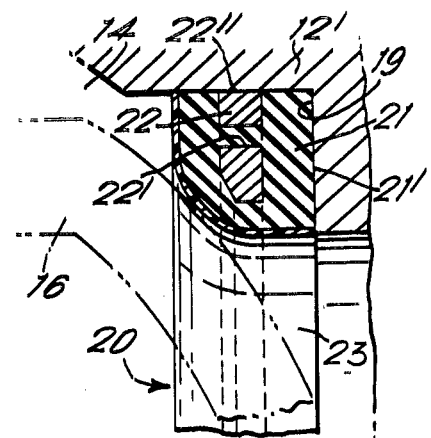
FIG. 3 is an elevational view, in vertical section, of the seat ring of FIG. 2.
Figure 3:
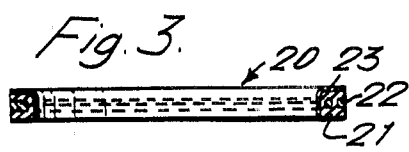
Figure 6:
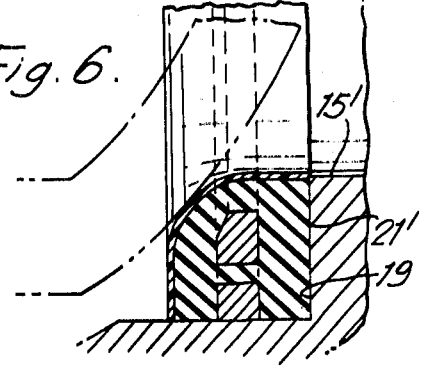
FIG. 6 is a fragmentary enlarged view of FIG. 1.

The iron core 22 may be provided with holes 22' circumferentially spaced apart from each other so that the rubber of the annular body 21 fills the holes 22', thereby achieving a secure combination of the body 21 and the core 22. In the illustrated embodiment, the iron core 22 is not completely covered by the material of the annular body 21, with its peripheral surface 22" being exposed as best shown in FIG. 3, but the iron core may be completely embedded in the rubber of the annular body 21 so as not to be seen exteriorly. In the illustrated embodiment, the iron core 22 is generally rectangular in cross section. It may be circular, square or of any other shapes in cross section.

The material of the lamina 23 must be highly resistive to wear and have as low a frictional resistance as possible, and yet provide a good sealing effect at the contacting surface with the ball 16. "Teflon," a du Pont's trademark of tetrafluoroethylene, is among the most suitable as the material of the lamina 23. The Teflon lamination or coating 23 may completely envelop the rubber annular body 21, if desired, but the partial lamination or coating at the portion thereof where contact with the ball 16 occurs is sufficient in practice.

Thus, in accordance with the invention, the iron ring 22 provides a rigid core which helps make the whole structure of the seat ring 20 stronger than the conventional seat rings having no such core ring and prevent the seat ring from receiving strong internal stress and strain; and the Teflon lamina or coating 23 provides a very smooth contacting surface for the ball 16, which can be turned smoothly by a relatively small force, and in combination with the resilient rubber annular body 21, assures a very good sealing effect between the seat ring and the ball.

What I claim is:

1. A ball valve comprising: a valve body having a valve chamber formed therein; tubular inlet and outlet ports; a ball disposed in said chamber and rotatably supported therein so as to selectively open and close said valve; and a seat ring disposed in said valve chamber in sealing contact with the inner surface thereof and the outer surface of said ball, said seat ring comprising an annular body made of rubber, an annular core made of a rigid material of generally rectangular cross section, three sides of said cross section being enclosed by said rubber around the circumference of said seat ring a film lamina of a plastic material covering at least that portion of the outer surface of said annular body which is in sealing contact with said ball, said rubber and the fourth cross-sectional surface of said core forming a cylindrical surface which is straight in cross section, said sealing ring seating on the body of said valve along an area adjacent to a port of said valve, the seat in said body being formed, relative to said port, of one radially and one axially extending surface, said radial surface and said axial surface meeting at right angles, said rubber in sealing contact with said radial surface, and said surface formed by said rubber and said core in sealing contact with said axial surface.

2. The seat ring of claim 1, wherein said annular core is provided with a plurality of holes circumferentially spaced apart from each other and filled with said rubber of said annular body for secure combination of said body and core.

3. The seat ring of claim 1, wherein said lamina is formed by affixing a plastic film to said outer surface portion of said annular body.

4. The seat ring of claim 1, wherein said lamina is formed by coating said outer surface portion of said annular body with a plastic material.

5. The seat ring of claim 1, wherein said plastic material of said lamina is tetrafluoroethylene.